May 30, 1961  D. J. McCONNELL  2,986,047
FEEDING MECHANISM FOR SAW SHARPENING MACHINE
Filed Feb. 6, 1959  3 Sheets-Sheet 1
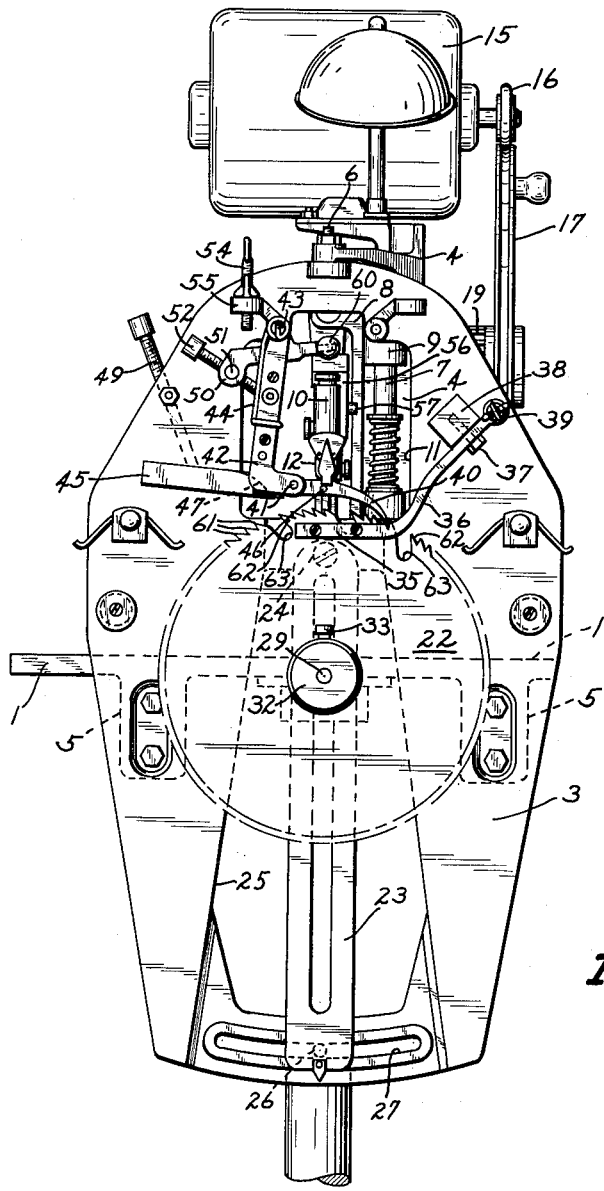
Fig. 1
INVENTOR.
DUANE J. McCONNELL
BY
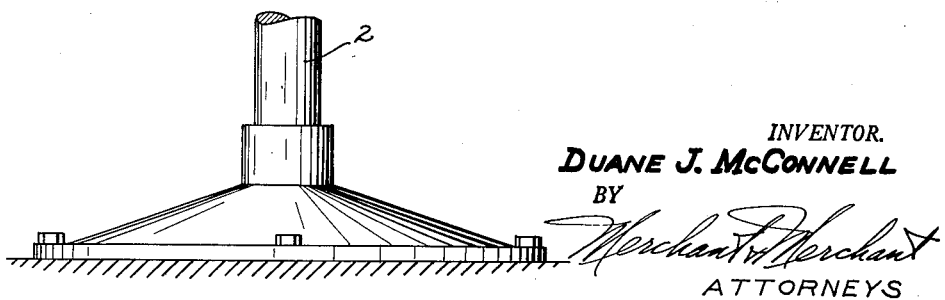
ATTORNEYS INVENTOR.
DUANE J. McCONNELL
BY
Merchant & Merchant
ATTORNEYS May 30, 1961  D. J. McCONNELL  2,986,047
FEEDING MECHANISM FOR SAW SHARPENING MACHINE
Filed Feb. 6, 1959  3 Sheets-Sheet 3

INVENTOR.
DUANE J. McCONNELL
BY
Merchant & Merchant
ATTORNEYS

United States Patent Office 2,986,047
Patented May 30, 1961

2,986,047
FEEDING MECHANISM FOR SAW SHARPENING MACHINE

Duane J. McConnell, Minneapolis, Minn., assignor to Foley Manufacturing Company, Minneapolis, Minn., a corporation of Minnesota Filed Feb. 6, 1959, Ser. No. 791,711

5 Claims. (Cl. 76—35)

My invention relates generally to saw-filing machines, and more particularly to improvements in saw-filing machines of the type disclosed in the F. E. Collier Patent 1,728,393.

In filing machines of the above type, a saw being filed is advanced in a step by step movement by a feed pawl which engages a tooth immediately after the file has made a sharpening stroke thereon, and moves the saw for a predetermined distance to dispose another tooth in the path of travel of the file. This arrangement has worked satisfactorily with both straight and circular saws having teeth which are uniformly spaced throughout the length or circumference of the saw. However, with the coming into extensive use of combination saws—those having groups of teeth wherein the spacing between the groups thereof differs from the spacing of the teeth within said groups, the former feeding arrangement was not adequate to advance these saws in a manner whereby correct spacing could be obtained from one group of teeth to the next subsequent group. In combination saws, each group of teeth includes a plurality of cutting teeth and a raker tooth, the groups being separated by the gullet of the raker tooth of each group, the raker gullets being of considerably greater size and depth than the cutting tooth gullets.

The primary object of my invention is the provision of novel mechanism for imparting step by step advancing movement to a saw of the combination type in a manner whereby such saws may be quickly and efficiently sharpened without regard for the difference in spacing between the groups of teeth and that of the teeth in each group thereof. To this end, my novel feeding mechanism advances a saw to be sharpened in such steps that corresponding teeth in each group are filed in succession. For example, all of the first teeth of said groups thereof are filed successively, after which all of the second teeth or the third teeth, if desired, are filed in succession, and so on until all of the teeth in said groups thereof are sharpened.

Another important object of my invention is the provision of saw-advancing mechanism which can be quickly and easily adjusted to feed or advance saws having teeth of various sizes and of various tooth spacing. Still another object of my invention is the provision of saw-advancing mechanism which is responsive to movement of a sharpening file in a direction of movement away from the saw being sharpened, to impart advancing movement to the saw, and which is responsive to reciprocatory movement of the file in one direction to impart further advancing movement to the saw.

Another object of my invention is the provision of saw-advancing means as set forth, which is simple and inexpensive to produce and install on a saw-filing machine, which is highly efficient in operation, and which is rugged in construction and durable in use.

The above, and still further highly important objects and advantages of my invention will become apparent from the following detailed specification, appended claims, and attached drawings.

Referring to the drawings, which illustrate the invention, and in which like reference characters indicate like parts throughout the several views:

Fig. 1 is a view in front elevation of a saw-filing machine made in accordance with my invention;

Figure 2:
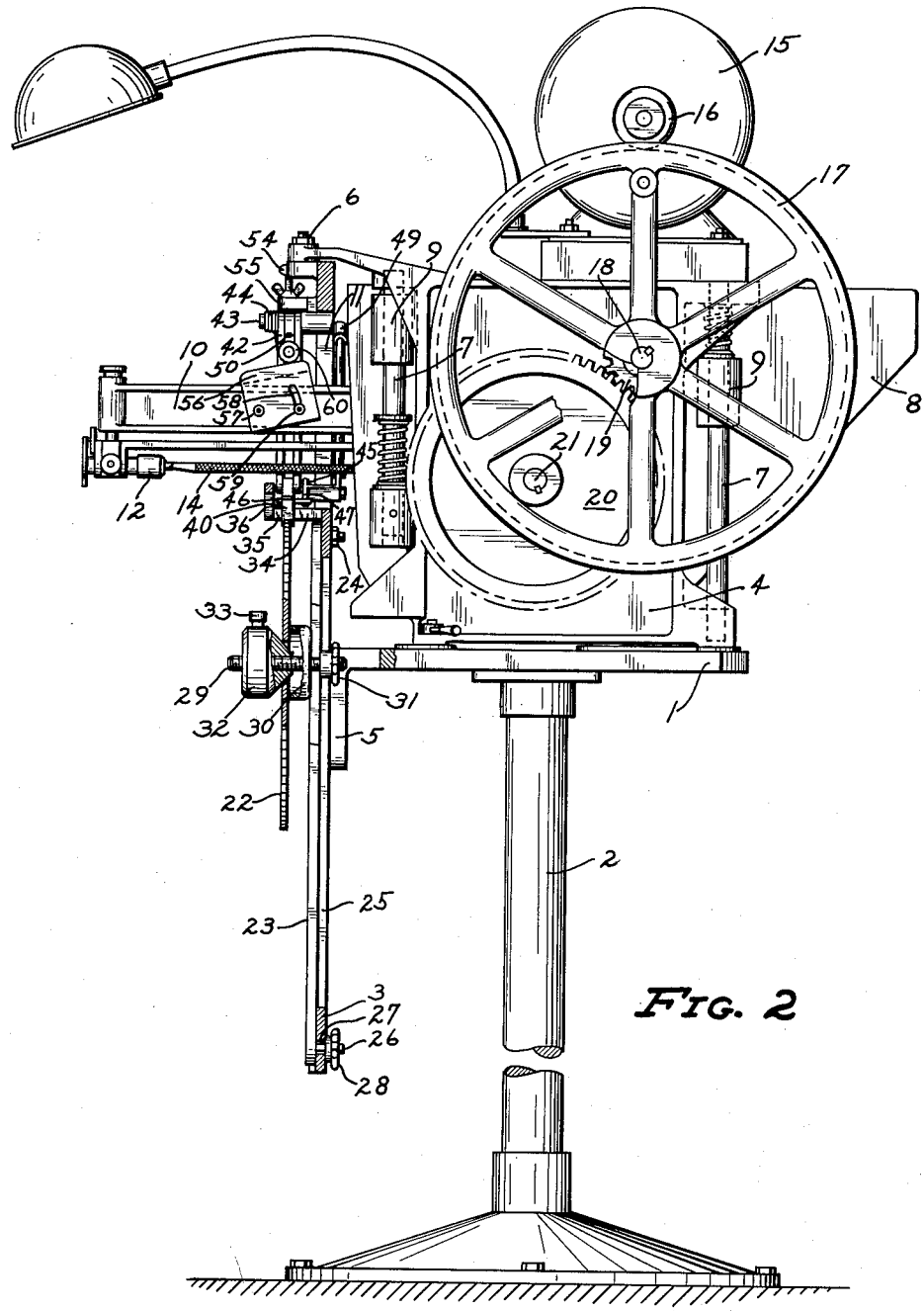
Fig. 2 is a view in side elevation of the filing machine as seen from the right to the left with respect to Fig. 1, some parts being broken away and some parts being shown in section.

Referring with greater detail to the drawings, the numeral 1 indicates a horizontally disposed base which, as shown in Figs. 1–2, is supported by suitable means such as a standard or the like 2. The base 1 supports frame structure comprising a front plate 3 and an upright frame element 4, the former of which is bolted or otherwise rigidly secured to a pair of depending ears 5 at the front of the base 1, and the latter of which is pivotally secured to the front plate for swinging movements about a vertical axis, as indicated at 6. A pair of horizontally spaced parallel vertical guide rods 7 are rigidly secured to the upright frame element 4 to support a carrier plate 8 which is formed to provide laterally spaced bosses 9 that are bored to slidably receive the guide rods 7, see Fig. 2, whereby the carrier plate is capable of vertical reciprocatory movements with respect to the frame element 4. A file-carrying file arm 10 is mounted on the carrier plate 8 for forward and rearward reciprocatory movements through an opening 11 in the front plate 3, and is provided with front and rear sockets 12 and 13 respectively for mounting a file 14. Means for imparting vertical reciprocatory movements to the carrier plate 8 and horizontal forward and rearward reciprocatory movements to the file arm 10 comprises, a drive motor 15 mounted on the upper end of the frame element 4, a drive wheel 16 rigidly mounted on the shaft of the drive motor 15, a fly wheel 17 in operative engagement with the drive wheel 16 and journalled to the frame element 4 by means of a shaft 18, a drive pinion 19 also mounted on the shaft 18, a gear 20 in meshing engagement with the drive pinion 19, and a crank shaft 21 journalled in the frame element 4 and rigidly mounting the gear 20. Substantially the entire above described structure is clearly disclosed in the Collier patent, above-identified, including crank connections between the crank shaft 21 and the carrier plate 8 and file arm 10, not herein shown, reference being had to said Collier patent. For the sake of brevity, further detailed showing and description of the above-mentioned structure is omitted.

A circular saw 22 is disposed in underlying relationship to the file arm 10 and file 14 carried thereby, and is releasably mounted on a slotted mounting bar 23 which is pivotally secured at its upper end to the front plate 3 below the opening 11 therein, by means of a nut-equipped bolt 24. The mounting arm 23 extends downwardly within an opening 25 in the front plate 3, the lower end of the mounting arm 23 being provided with a clamping screw 26 that extends rearwardly through a horizontally disposed slot 27 in the bottom portion of the front plate 3, the lower end of the mounting arm 23 being releasably locked in desired set positions relative to opposite ends of the slot 27 by a clamping nut or the like 28, see particularly Fig. 2. A mounting stud or the like 29 extends transversely through the slot in the mounting arm 23, and is held in place on the mounting arm 23 by a cup-shaped nut 30 and a threaded hand wheel 31 screw threaded on the stud 29 at the front and rear sides respectively of the mounting arm 23. A cone-shaped nut 32 is screw-threaded on the front end portion of the stud 29 and extends through the usual central aperture found in circular saw blades such as the saw 22, to center the saw 22 on the axis of the stud 29, see Fig. 2. Normally, the cone-shaped nut 32 is drawn up on the stud 29 sufficiently to accurately center the saw 22 and to permit free rotation thereof. Preferably, the cone-shaped nut 32 is releasably locked in place by a conventional set screw or the like, indicated at 33. The upper marginal portion of the saw 22 is supported against lateral movement axially of the saw by cooperating gripping jaws 34 and 35, the former of which is rigidly secured to the front plate 3, and the latter of which is rigidly secured to the lower end portion of a clamping arm 36 which is pivotally secured, as indicated at 37, to a lug 38 rigidly mounted on the front surface of the front plate 3. A wing nut-equipped thumb screw 39 is screw threaded through the outer end portion of the clamping arm 36, the inner end of the thumb screw 39 having abutting engagement with the front plate 3. Adjustment of the thumb nut 39 loosens or tightens pressure on the marginal portion of the blade gripped by the jaws 34 and 35.

Figure 4:
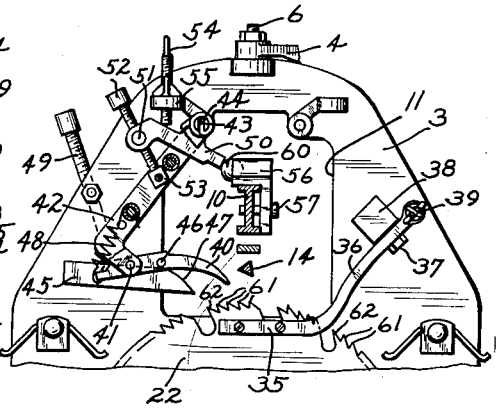
Fig. 4 is a fragmentary view corresponding to a portion of Fig. 1, but showing some of the parts positioned according to Fig. 3, some parts being removed, and some parts shown in section.

A feed pawl 40 is pivotally secured, as indicated at 41, to the lower end of a bifurcated rocker arm element 42 that is pivotally secured to a mounting shaft 43 which projects forwardly outwardly of the front plate 3 on an axis parallel to the axis of the saw 22. The rocker arm element 42 partakes of rocking movement in a saw-advancing direction counterclockwise with respect to Figs. 1, 4 and 8, and in a return direction clockwise with respect to Figs. 1, 4 and 8, a torsion spring 44 yieldingly urging the rocker arm element 42 in said return direction. Movement of the feed pawl 40 toward and away from engagement thereof with the teeth of the saw 22, during said rocking movements of the rocker arm element 42, is controlled by a jointing guide 45 adjustably mounted on the front plate 3. The feed pawl 40 is provided with a rearwardly projecting guide pin 46 which rides on a curved surface portion 47 of the jointing guide 45, and is yieldingly urged toward engagement with said surface 47 by a coil tension spring 48 connected at one end to the feed pawl 40 and at its other end to the rocker arm element 42, see Fig. 4. Adjustment of the jointing guide 45 is had through a thumb screw 49 in a manner similar to that disclosed in the United States Letters Patent to F. E. Collier, No. 2,343,171, reference being had thereto. A second rocker arm element 50 is pivotally mounted, intermediate its ends, on the mounting shaft 43, and at one end is provided with a nut element 51 which is pivotally mounted thereon and which screw threadedly receives an adjustment screw 52, one end of which is pivotally connected to an anchoring block 53 which in turn is pivotally connected to the rocker arm element 42, whereby the rocker arm elements 42 and 50 partake of common rocking movements, but by means of which the angular relationship between the rocker arm elements 42 and 50 may be varied as desired. A wing nut-equipped stop screw 54 is screw threadedly received in a bracket 55 projecting forwardly from the front plate 3, the lower end of the stop screw 54 engaging the rocker-arm element 50 to limit its swinging movement in a return direction. Saw-advancing movement is imparted to the feed pawl 40 against bias of the torsion spring 44 by a cam 56 which is pivotally mounted on the file arm 10, as indicated at 57. The cam 56 is provided with a slot 58 through which extends a locking screw 59, by means of which the cam 56 may be locked in desired adjusted positions relative to the file arm 10. The cam 56 is adapted to engage a generally spherical cam follower roller 60 that is journalled on the end of the rocker arm element 50 opposite the nut element 51.

Figure 3:
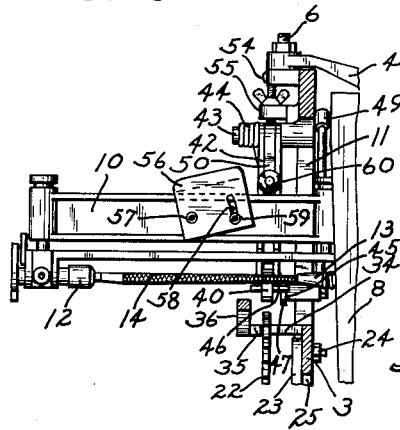
Fig. 3 is a fragmentary view corresponding to a portion of Fig. 2 but showing a different position of some of the parts.
Figure 5:
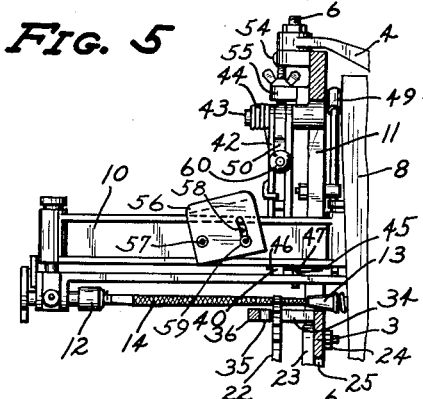
Fig. 5 is a view corresponding to Fig. 3 but showing a still different position of some of the parts.
Figure 6:
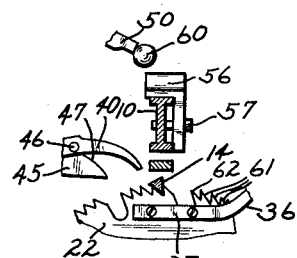
Fig. 6 is a view corresponding to Fig. 4 but showing some of the parts positioned according to Fig. 5, some parts being removed.
Figures 7, 8:
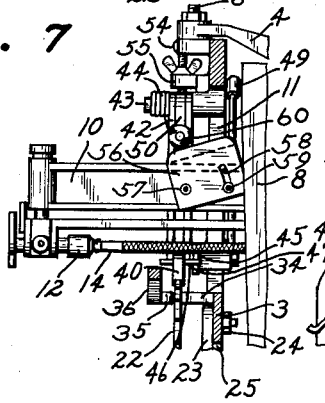
Fig. 7 is a fragmentary view corresponding to Figs. 3 and 5, but showing a still different position of some of the parts.
Fig. 8 is a view corresponding to Fig. 4 but showing some of the parts positioned according to Fig. 7.

During the filing of the teeth of a saw, the file arm 10 and file 14 partake of forward and rearward reciprocatory movement, the rearward movement thereof being the filing or cutting stroke of the file 14, as indicated in Figures 5 and 6. When the file arm 10 reaches substantially its limit of rearward movement, the carrier plate 8 is raised with respect to the frame element 4, carrying with it the file arm 10 and file 14 in an upward direction away from engagement of the file 14 with the teeth of the saw 22, as shown in Figs. 7 and 8. The file arm 10 and file 14 are then moved in a forward direction of their reciprocatory movement, as indicated in Figs. 2 and 3, until the file arm 10 reaches substantially its limit of forward travel, at which time the file arm 10 and file 14 are moved downwardly with the carrier plate 8, into operative engagement of the file 14 with the saw 22 to start another sharpening stroke.

It will be noted that, as the file arm 10 moves upwardly at the rear end portion of its filing stroke, the front end portion of the cam 56 engages the cam follower roller 60 to move the same upwardly, whereby to impart movement to the feed pawl 40 in a saw-advancing direction from the left to the right with respect to Figs. 1, 4, 6, and 8. When the machine is used to sharpen saws having evenly spaced teeth throughout the length or circumference thereof, the above described upward movement of the file arm 10 is sufficient to impart the rocking movement to the rocker arm element 42 and 50 necessary to move the feed pawl 40 to advance the saw to the distance required. When sharpening such saws, the cam 56 is so adjusted on the file arm 10 that the top cam-follower engaging surface thereof is disclosed in a horizontal plane parallel to the direction of forward and rearward reciprocatory movement of the file arm 10.

In combination saws, the teeth are not arranged in the manner of the usual cross cut or ripping saws, the teeth in combination saws being arranged in separated groups, each group comprising a raker tooth and a plurality of cutting teeth, the gullets of the cutting teeth being of a common depth and the raker tooth gullets being of greater size and depth than those of the cutting teeth. In the drawings, the cutting teeth are indicated at 61, the raker teeth at 62, and the large raker tooth gullets being indicated at 63. Due to the extreme size of the raker tooth gullets 63, it has been found that the best method of sharpening combination saws with the type of machine above described, is to have the saw-advancing mechanism set to advance the saw 22 a distance corresponding to the length of one of the groups of teeth so that, when a given tooth in one group has been filed, the corresponding tooth in the next subsequent group thereof will be positioned to be filed on the next filing stroke of the file 14. This type of operation calls for greater advancing movement of the rocker arm elements 42 and 50 than has been heretofore obtained through the movement of the file arm 10 in a direction away from the saw. When sharpening combination saws in the manner above described, the cam 56 is adjusted to its position shown in the drawings. With the cam 56 thus adjusted, initial upward movement of the file arm 10 at the rearward end portion of its filing stroke will bring the lower front end portion of the cam 56 into engagement with the cam-follower roller 60 to impart initial advancing movement of the rocker arm elements 42 and 50 and to the feed pawl 40. Then, as the file arm 10 moves forwardly on its return stroke, the cam-follower roller 60 will be caused to move upwardly on the top face of the cam 56 to impart further advancing movement to the feed pawl 40. Thus, the saw is rotated to the desired extent with each return stroke of the file arm 10, so that corresponding teeth in each group thereof are sharpened. With the adjustments obtained by the adjustment screws 49 and 52, together with that obtained by shifting of the angle of the cam 56, the user is able to quickly and easily set the machine to sharpen substantially all types of saws in general present day use.

My novel feeding mechanism has been thoroughly tested and found to be completely satisfactory for the accomplishment of the objectives set forth; and, while I have shown and described a commercial embodiment of my feeding mechanism for saw sharpening machines, it will be understood that the same is capable of modification without departure from the spirit and scope of the invention, as defined in the claims.

What I claim is:

1. In a saw-filing machine comprising, a frame structure, means for supporting a saw for advancing movements relative to said frame structure, a file carrying file arm element mounted and guided for reciprocatory movements transversely of a saw mounted in said mounting means and for movements toward and away from said saw, whereby on each cycle of operation a file carried by said file arm element moves in one direction of its reciprocatory movement in cutting engagement with a tooth on said saw and in the opposite direction in outwardly spaced relation to said tooth, means for imparting said movements to the file arm element, and a saw-tooth engaging feed pawl for imparting said advancing movement to said saw; the combination of a rocker arm element pivotally mounted on said frame structure for rocking movements in a saw advancing direction and in an opposite return direction and operatively connected to said feed pawl, and a cam on one of said elements operatively engaging the other of said elements during movement of said file arm element in said direction away from said saw to impart initial movement to said rocker arm element and feed pawl in a saw tooth advancing direction, said cam being also responsive to said reciprocatory movement of said file arm element in said opposite direction to impart further saw-advancing movement to said rocker arm element and said feed pawl.

2. In a saw-filing machine comprising, a frame structure, means for supporting a saw for advancing movements relative to said frame structure, a file carrying file arm mounted and guided for reciprocatory movements transversely of a saw mounted in said saw mounting means and for movements toward and away from said saw, whereby on each cycle of operation a file carried by said file arm moves in one direction of its reciprocatory movement in cutting engagement with a tooth on said saw and in the opposite direction in outwardly spaced relation to said tooth, means for imparting said movements to the file arm, and a saw-tooth engaging feed pawl for imparting said advancing movement to said saw; the combination of rocker arm means pivotally mounted on said frame structure for rocking movements in a saw advancing direction and in an opposite return direction and operatively connected to said feed pawl, and a cam on said file arm engaging a portion of said rocker arm means during movement of said file arm in said direction away from said saw to impart initial movement to said rocker arm means and feed pawl in a saw tooth advancing direction, said cam also being responsive to said reciprocatory movement of said file arm in said opposite direction to impart further saw-advancing movement to said rocker arm means and feed pawl.

3. In a saw-filing machine comprising, a frame structure, means for supporting a saw for advancing movement relative to said frame structure, a file carrying file arm mounted and guided for reciprocatory movement transversely of a saw mounted in said saw mounting means and for movements toward and away from said saw, whereby on each cycle of operation a file carried by said file arm moves in one direction of its reciprocatory movement in cutting engagement with a tooth on said saw and in the opposite direction in outwardly spaced relation to said tooth, means for imparting said movements to the file arm, and a saw tooth-engaging feed pawl for imparting said advancing movements to said saw; the combination of rocker arm means pivotally mounted on said frame structure for rocking movements in a saw-advancing direction and in an opposite return direction and operatively connected to said feed pawl, a cam mounted on said file arm for adjustment in directions transversely of the direction of said reciprocatory movement of the file arm, and means for releasably locking said cam in adjusted positions on said file arm, said cam engaging a portion of said rocker arm means during movement of said file arm in said direction away from said saw to impart initial movement to said rocker arm means and said feed pawl in a saw-tooth advancing direction, said cam being also responsive to said reciprocatory movement of said file arm in said opposite direction to impart further saw advancing movement to said rocker arm means and said feed pawl.

4. In a saw-filing machine comprising, a frame structure, means for supporting a saw for advancing movements relative to said frame structure, a file carrying arm mounted and guided for reciprocatory movements transversely of a saw mounted in said saw mounting means and for movements toward and away from said saw, whereby on each cycle of operation a file carried by said file arm moves in one direction of its reciprocatory movement in cutting engagement with a tooth on said saw and in the opposite direction in outwardly spaced relation to said tooth, means for imparting said movements to the file arm, and a saw tooth engaging feed pawl for imparting said advancing movements to said saw; the combination of rocker arm means including a pair of cooperating rocker arm elements pivotally mounted on said frame structure for rocking movements in a saw-advancing direction and in a return direction, one of said rocker arm elements being operatively connected to said feed pawl, a cam on said file arm engaging the other of said rocker arm elements during movement of said file arm in said direction away from said saw to impart initial movement to said rocker arm means and said feed pawl in a saw-tooth advancing direction, said cam being also responsive to said reciprocatory movement of said file arm in said opposite direction to impart further saw tooth advancing movement to said rocker arm means and said feed pawl, and means for adjustably moving one of said rocker arm elements with respect to the other thereof about the axis of pivotal movement of said rocker arm elements.

5. The structure defined in claim 4 in which said last-mentioned means comprises an adjustment screw carried by one of said rocker arm elements and a nut carried by the other of said rocker arm elements and cooperating with said adjustment screw to vary the position of said feed pawl at the limit of advancing movement thereof, and in which said cam is adjustably movable on said file arm in directions to vary the extent of movement imparted thereby to said rocker arm means during said reciprocatory movement of the file arm in said opposite direction.

References Cited in the file of this patent
UNITED STATES PATENTS

| 1,508,574 | Peterson | Sept. 16, 1924 |
| 2,655,057 | Hull | Oct. 13, 1953 |